(12) United States Patent
Shue

(10) Patent No.: US 10,266,250 B2
(45) Date of Patent: Apr. 23, 2019

(54) CONTROL INCEPTOR MANAGEMENT SYSTEM

(71) Applicant: Bell Helicopter Textron Inc., Fort Worth, TX (US)

(72) Inventor: ShyhPyng Jack Shue, Grapevine, TX (US)

(73) Assignee: Bell Helicopter Textron Inc., Fort Worth, TX (US)

(*) Notice: Subject to any disclaimer, the term of this patent is extended or adjusted under 35 U.S.C. 154(b) by 145 days.

(21) Appl. No.: 15/166,478

(22) Filed: May 27, 2016

(65) Prior Publication Data

US 2017/0036753 A1 Feb. 9, 2017

Related U.S. Application Data

(60) Provisional application No. 62/174,785, filed on Jun. 12, 2015.

(51) Int. Cl.

| | | |
|---|---|---|
| *B64C 13/22* | (2006.01) | |
| *B64C 37/02* | (2006.01) | |
| *H04W 4/90* | (2018.01) | |
| *B64C 39/02* | (2006.01) | |
| *B64D 45/00* | (2006.01) | |
| *B64C 29/00* | (2006.01) | |
| *G05D 1/00* | (2006.01) | |
| *G05D 1/08* | (2006.01) | |

(52) U.S. Cl.
CPC .......... *B64C 13/22* (2013.01); *B64C 29/0033* (2013.01); *B64C 39/024* (2013.01); *B64D 45/0015* (2013.01); *G05D 1/0022* (2013.01); *G05D 1/0061* (2013.01); *G05D 1/0858* (2013.01); *B64D 2045/0055* (2013.01)

(58) Field of Classification Search
CPC ....... B64C 13/22; B64C 37/02; B64C 39/024; G01C 21/005; H04W 4/22; H04W 4/90; B61C 1/38; H04B 3/542; A63H 27/00
See application file for complete search history.

(56) References Cited

U.S. PATENT DOCUMENTS

| | | | | |
|---|---|---|---|---|
| 3,097,445 | A * | 7/1963 | Lindley ................... | A63H 27/00 244/155 A |
| 8,950,698 | B1 * | 2/2015 | Rossi ...................... | B64C 37/02 244/2 |
| 9,120,568 | B2 * | 9/2015 | Herman ................ | B64C 39/024 |
| 2013/0003756 | A1 * | 1/2013 | Mitchell ............... | H04B 3/542 370/464 |
| 2013/0299640 | A1 * | 11/2013 | Kelly ....................... | B66C 1/38 244/137.4 |
| 2015/0133073 | A1 * | 5/2015 | Mitchell ................ | H04W 4/90 455/404.1 |
| 2016/0306363 | A1 * | 10/2016 | Wang .................... | G01C 21/005 |

* cited by examiner

*Primary Examiner* — Yuri Kan
(74) *Attorney, Agent, or Firm* — Lightfoot & Alford PLLC

(57) ABSTRACT

In some embodiments, a control manager is disposed between the rotor system and the flight control inceptor. The control manager is configured to receive control commands wirelessly from a ground control station, translate the control commands into one or more axes associated with the flight control inceptor, and transmit the translated control commands to the rotor system in place of the instructions received from the pilot via the flight control inceptor.

1 Claim, 13 Drawing Sheets

| INCEPTOR\CONTROLLER | LATERAL | LONGITUDINAL | THRUST | DIRECTIONAL |
|---|---|---|---|---|
| FLIGHT CONTROLS SURFACE | L/R AILERONS + FLAP | ELEVATORS + HORIZONTAL STABILIZERS | ENGINE RPM, BLADE ANGLE OR THRUST ANGLE | RUDDERS |
| INCEPTORS | (L/R) CENTER STICK OR SIDEARM CONTROL | (L/R) CENTER STICK OR SIDEARM CONTROLS | THRUST LEVEL | PEDAL |
| FUNCTIONS | LEFT / RIGHT TURNS | CLIMB / DESCENT | ACCELERATE / DECELERATE | L/R SIDESLIP CONTROLS |

FIG. 3

| INCEPTOR\CONTROLLER | LATERAL | LONGITUDINAL | COLLECTIVE | DIRECTIONAL |
|---|---|---|---|---|
| FLIGHT CONTROLS SURFACE | L/R ROTOR FLAPPING | FWD/AFT ROTOR FLAPPING | ROTOR BLADE PITCH ANGLE (MAINTAIN 100% RPM) | TAIL ROTOR BLADE PITCH ANGLE |
| INCEPTORS | (L/R) CENTER STICK OR SIDEARM CONTROL | (L/R) CENTER STICK OR SIDEARM CONTROLS | COLLECTIVE LEVEL | PEDAL |
| FUNCTIONS | HIGH SPEED LEFT / RIGHT TURNS LOW SPEED SIDEWARD VELOCITY CONTROLS | CLIMB / DESCENT | ACCELERATE / DECELERATE | L/R HIGH SPEED COORDINATION TURN ASSISTANCE LOW SPEED L/R LEVEL TURNS |

FIG. 4

| INCEPTOR \ CONTROLLER | LATERAL | LONGITUDINAL | THRUST | DIRECTIONAL |
|---|---|---|---|---|
| FLIGHT CONTROLS SURFACE | L/R AILERONS + FLAP | ELEVATORS | BLADE COLLECTIVE ANGLE | RUDDERS + L/R DIFFERENTIAL COLLECTIVE PITCH ANGLES |
| INCEPTORS | (L/R) CENTER STICK OR SIDEARM CONTROL | (L/R) CENTER STICK OR SIDEARM CONTROLS | THRUST OR COLLECTIVE LEVEL | PEDAL |
| FUNCTIONS | LEFT/RIGHT TURNS | CLIMB / DESCENT | ACCELERATE / DECELERATE | L/R SIDESLIP CONTROLS |

FIG. 6  600

| INCEPTOR \ CONTROLLER | LATERAL | LONGITUDINAL | COLLECTIVE | DIRECTIONAL | ACCEL/DECEL |
|---|---|---|---|---|---|
| FLIGHT CONTROLS SURFACE | L/R ROTOR FLAPPING | FWD/AFT ROTOR FLAPPING | ROTOR BLADE PITCH ANGLE (MAINTAIN 100% RPM) | DIFFERENTIAL UPPER AND LOWER COAXIAL ROTOR TORQUES AND ROTOR BLADE PITCHING ANGLES | TAIL ROTOR BLADE PITCHING ANGLE |
| INCEPTORS | (L/R) CENTER STICK OR SIDEARM CONTROL | (L/R) CENTER STICK OR SIDEARM CONTROLS | COLLECTIVE LEVEL | PEDAL | CYCLIC THRUST BEEP FUNCTION |
| FUNCTIONS | HIGH SPEED LEFT / RIGHT TURNS LOW SPEED SIDEWARD VELOCITY CONTROLS | CLIMB / DESCENT | ACCELERATE / DECELERATE | L/R HIGH SPEED COORDINATION TURN ASSISTANCE LOW SPEED L/R LEVEL TURNS | QUICKLY SPEED UP OR SLOW DOWN BY INCREASING / DECREASING TAIL BLADE ANGLE |

FIG. 7  700

| NO | INCEPTOR COMMAND | FUNCTION | MAIN CONTROL | COMMENT |
|---|---|---|---|---|
| 1 | NACELLE TILT BEEP | FWD/AFT | NACELLE TILT ANGLE | V22, BA609, V280 |
| 2 | COLLECTIVE LEVER | BOB UP/DOWN | BLADE PITCH ANGLE | BA609 AND V280 |
| 3 | THRUST LEVER | FWD/AFT | BLADE PITCH ANGLE | V-22 USING THROTTLE, INSTEAD OF COLLECTIVE LEVER |
| 4 | CYCLIC CONTROLLER | FWD/AFT | LONGITUDINAL FLAPPING | CENTER STICK OR SIDE-ARM OR WHEEL CONTROL |
| 5 | CYCLIC CONTROLLER | LEFT/RIGHT | LATERAL FLAPPING | CENTER STICK OR SIDE-ARM OR WHEEL CONTROL |
| 6 | DIRECTIONAL PEDAL | LEFT/RIGHT | YAW/SIDESLIP CONTROL | BACK-DRIVEN OR UNIQUE TRIM CONTROL |
| 7 | FLAP SETTING CONTROL | UP/DOWN | FLAP SETTINGS | AUTO-FLAP OR MANUAL CONTROL |
| 8 | CYCLIC FORCE TRIM RELEASE | RESET CYC TRIM AND FORCE | LAT/LON FTR AS A GROUP | LAT/LON FTR CONTROL AS A GROUP |
| 9 | COLLECTIVE FTR | RESET COL TRIM AND FORCE | RESET COLLECTIVE FORCE FEEL | COL AND PEDAL FTR ACAN WORK AS A GROUP |
| 10 | PEDAL FTR | RESET PED TRIM AND FORCE | PEDAL AND COLLECTIVE MAY WORK AS A GROUP | PEDAL UNIQUE TRIM FOR V280 AND BA609, BUT NOT V-22 |
| 11 | COLLECTIVE BEEP | UP/DOWN | BLADE PITCHING ANGLE SMALL ADJUSTMENT | SMALL UP/DOWN FUNCTION |
| 12 | PITCH BEEP | FWD/AFT | LON SMALL ADJUSTMENT | SMALL PITCH FORE/AFT FUNCTION |
| 13 | ROLL BEEP | LEFT/RIGHT | LAT SMALL ADJUSTMENT | SMALL ROLL L/R ANGLE FUNCTION |
| 14 | YAW BEEP | LEFT/RIGHT | DIRECTIONAL SMALL ADJUSTMENT | SMALL HDG L/R FUNCTION |
| 15 | RPM BEEP OR TURNING KNOB | INCREASE / DECREASE | SMALL RPM ADJUSTMENT | MAY LIMIT WITHIN 5% RANGE |
| 16 | AUTOPILOT FUNCTIONS | VEL, HDG, ALT BALL CENTER | ALL HOLD MODES | BALL CENTER = ZERO SIDESLIP |
| 17 | NAVIGATION FLIGHT | WAYPOINTS, MISSIONS, ETC | SAR + FMS AND SO ON | LONG CRUISE FLIGHT |
| 18 | COMPOUND THRUST CONTROLLER OR THROTTLE [2] | ACCEL/DECEL | COMPOUND AIRCRAFT TAIL THRUST CONTROLLER | MANUAL CONTROL OF X2, X3 AIRSPEED |

FIG. 11

CONTROL INCEPTOR MANAGEMENT SYSTEM

RELATED APPLICATIONS

Pursuant to 35 U.S.C. § 119 (e), this application claims priority to U.S. Provisional Patent Application Ser. No. 62/174,785, entitled CONTROL INCEPTOR MANAGEMENT SYSTEM, filed Jun. 12, 2015. U.S. Provisional Patent Application Ser. No. 62/174,785 is hereby incorporated by reference.

TECHNICAL FIELD

This invention relates generally to aircraft control systems, and more particularly, to a control inceptor management system.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to provide an optionally-manned aircraft.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 3-7 shows tables describing various combinations of control inceptors;

FIG. 11 shows a data bus according to one example embodiment;

DETAILED DESCRIPTION OF THE DRAWINGS

Figure 1:
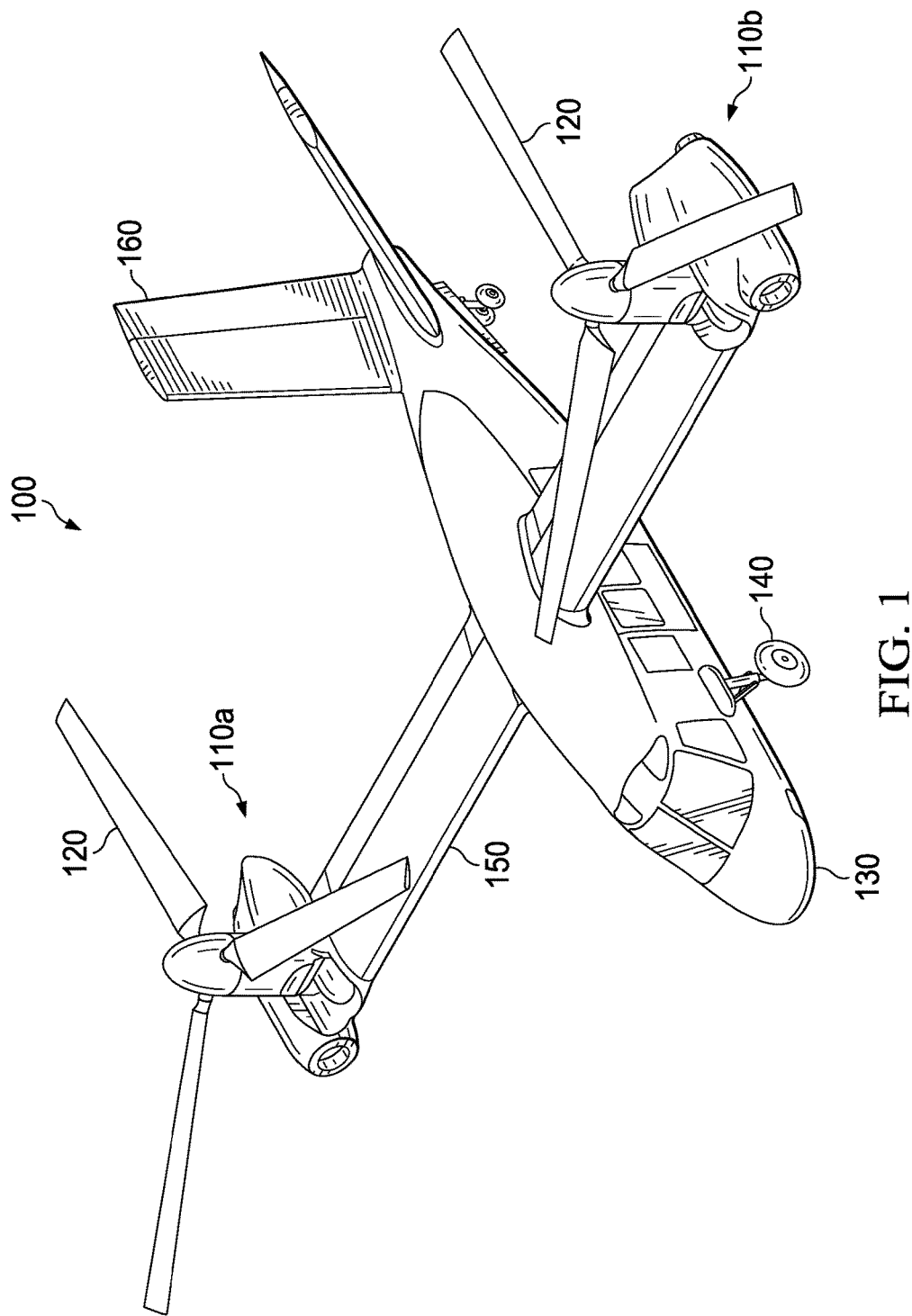
FIG. 1 shows a rotorcraft according to one example embodiment.

FIG. 1 shows a rotorcraft 100 according to one example embodiment. Rotorcraft 100 features rotor systems 110*a* and 110*b*, blades 120, a fuselage 130, a landing gear 140, a wing 150, and an empennage 160.

Rotor system 110 may rotate blades 120. Rotor system 110 may include a control system for selectively controlling the pitch of each blade 120 in order to selectively control direction, thrust, and lift of rotorcraft 100. In the example of FIG. 1A, rotorcraft 100 represents a tiltrotor aircraft, and rotor systems 110*a* and 110*b* feature rotatable nacelles. In this example, the position of nacelles 110*a* and 110*b*, as well as the pitch of rotor blades 120, can be selectively controlled in order to selectively control direction, thrust, and lift of tiltrotor aircraft 100.

Fuselage 130 represents the main body of rotorcraft 100 and may be coupled to rotor system 110 (e.g., via wing 150) such that rotor system 110 and blades 120 may move fuselage 130 through the air. Landing gear 140 supports rotorcraft 100 when rotorcraft 100 is landing and/or when rotorcraft 100 is at rest on the ground.

Teachings of certain embodiments relating to rotor systems described herein may apply to rotor system 110 and/or other rotor systems, such as non-tilting rotor and helicopter rotor systems. It should also be appreciated that teachings from rotorcraft 100 may apply to aircraft other than rotorcraft, such as airplanes and unmanned aircraft, to name a few examples.

In the example of FIG. 1, tiltrotor aircraft 100 may operate in a helicopter mode by tilting the nacelles upright and in an airplane mode by tilting the nacelles forward. Tiltrotor aircraft 100 may generate greater forward speed in airplane mode than in helicopter mode because, in airplane mode, blades 120 are oriented to generate greater thrust propelling the aircraft forward (somewhat analogous to a propeller).

Rotorcraft 100 also features at least one empennage 160. Empennage 160 represents a flight control surface coupled to the tail portion of fuselage 130. In the example of FIG. 1, rotorcraft 100 features two empennages 160. In this example embodiment, the combination of the two empennages 160 may represent a v-tail configuration.

In operation, according to one example embodiment, the control system of rotor system 110 may include a swashplate 112 in mechanical communication with blades 120. Repositioning the swashplate 112 may change the pitch of each blade 120 collectively or cyclically so as to selectively control the direction, thrust, and lift of rotorcraft 100.

Aircraft control conversion from manned, optionally manned and unmanned aircraft have been intensively developed and studied in all aircraft industries in the recent years, which include airplanes, helicopters, compound aircrafts, jets, propellers, and tiltrotors.

In the current aircraft design, an unmanned aircraft was either developed from a brand new program or converted from existing production aircraft. It was 100% converted purely to the unmanned operation. Manned types of aircraft were developed long time ago; therefore conversion of the legacy aircraft into optionally manned or unmanned aircraft from legacy aircraft had been seen as either neglected or ignored by the aircraft companies.

In fact, either can the new unmanned aircraft development program, or the legacy piloted aircraft be converted to be manned, optionally manned and unmanned aircraft, as long as the aircraft control portions being converted to fly-by-wire (FBW) type of vehicle management system (VMS) design and satisfying safety insurance. To successfully accomplish the above development, one of major challenging tasks may be on the control inceptor management.

Teachings of certain embodiments recognize the ability to provide control inceptor management. Although the example rotorcraft of FIG. 1 is a tiltrotor, teachings of certain embodiments recognize applicability to a variety of helicopters and airplanes.

Teachings of certain embodiments recognize the capability to manage the FBW flight control inceptors communicating with flight control computer to allow the aircraft to be operated with the following methods:

classical back-driven design, (1st manned (M) flight)
the new fly-by-way unique trim design (2nd manned flight),
Any combination of back-driven and unique trim stick flight (3rd manned flight); and/or
Optionally Manned (OM)
Unmanned (UM) operations
Embodiments may include a variety of control axes, including:
1) Collective/thrust controller (for collective control; for airplane thrust control)
2) Longitudinal or (forward/Aft) controller,
3) Lateral controller
4) Pedal controller
5) RPM (rotor craft, propeller, compound aircraft, tiltrotor) controller
6) Nacelle (Nacelle Tilt) controller (for tiltrotor related aircraft)
7) Tail thrust controller (for compound aircraft like X2, X3, etc)

Any un-used controllers may be reset as a default of zero input to disconnect the entire control loop.

Some embodiments can be operated with a single stay-alone function (single channel system), dual functions (dual channel system) and all functions (full FBW triple or quad or higher redundancy management system) with all avionics devices at the same aircraft depending on the flight control laws logic mode requirements in FCC.

The device can be a separated unit or the related software, which can be integrated/installed with the flight control computer or aircraft mission computer depending on aircraft vehicle management system (VMS) design.

Figure 2:
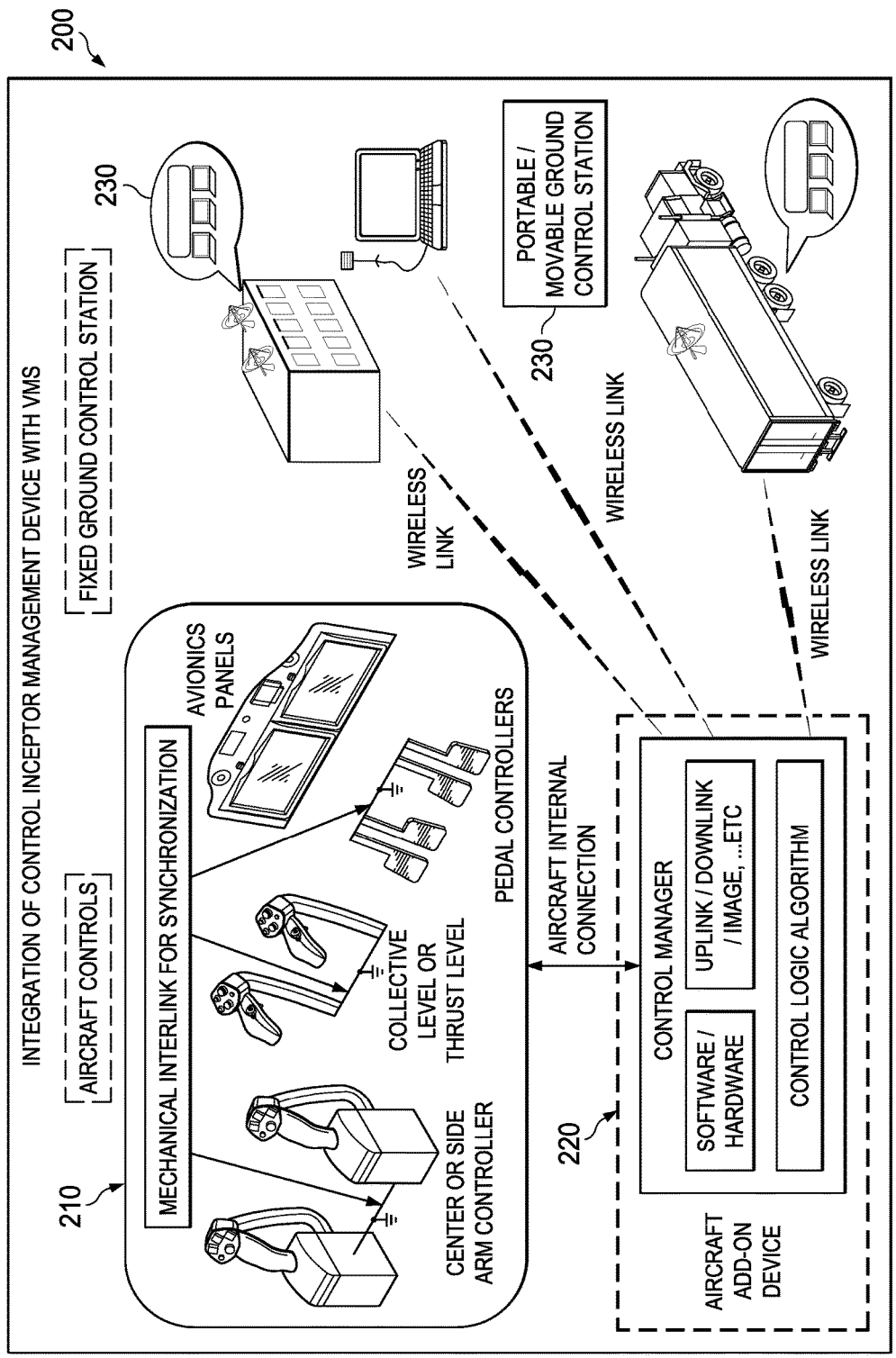
FIG. 2 shows a control inceptor management system according to one example embodiment.

FIG. 2 shows a control inceptor management system 200 according to one example embodiment. System 200 features aircraft controls 210, a control manager 220, and ground control stations 230.

As shown in FIG. 2, control manager 220 may receive all sensors and devices signals from aircraft initial (estimated) weight, sensors, controls, engines, and cockpit stick positions, other software data from related devices and control laws software soft states for mode switching. These mixed signals and data may be grouped up as a data string which may allow the apparatus to activate/manage/distinguish the required motion from commands. Such data transformation and management from one device to the other device may make the entire control system to be in the same configuration without any miss-communication. Therefore, control of aircraft using the invented apparatus can be operated and managed for any combined flight configurations such as manned, optionally manned and unmanned control systems.

In addition, the apparatus can also be used for any types of standard control inceptor configurations such as back driven versus unique-trim control design and any combination of back-driven and unique trim controllers.

Furthermore, the piloted flight control force feel system can also be managed and integrated using the apparatus with the standard VMS design so that all other advanced force feel functions can be implemented. These advanced force feel functions used in the apparatus can be the multiple force feel system for various flight regimes and configurations. For example, for helicopters, the force breakout feel and friction gradient with respect to stick travel in hover shall be approximately at 1 to 2 Lbs and 1 Lbs per inch to make the pilot easily reached handling qualities Level 1 requirement. However, for fast forward speed, the force breakout feel and friction gradient system may need to set up for a couple pounds higher values than that of the helicopter flight. With inceptor design, these functions can be easily implemented. Similarly, for tilt-rotor and compound aircraft, the control manager 220 can significantly improve the flight control system in force-feel handling qualities management and multi-requirements by multiple input gain scheduling methods.

In addition, control manager 220 can seamlessly be integrated and managed as (manned/optionally manned and unmanned operations) such that the entire VMS can easily transfer to any combined flight operations when the pilot is on-board in the cockpit.

For emergency condition such hijack condition for the commercial airplane, control manager 220 contains an emergency hijack mode algorithm to convert the entire control to be remotely. Therefore, safely guidance of aircraft back to the target destination becomes feasible.

FIG. 3 shows a table 300 describing the four control inceptors (lateral controller, longitudinal controller, thrust level, and directional controller) associated with classical fixed wing controls. Note that flapping settings are used during the take-off and landing maneuvers. In the higher speed flight, the flap angles are normally be set to fully up position. Likewise, the actuate-able horizontal stabilizer if installed was designed to be a slow function worked with trim algorithm to balance the steady state weight and C.G. for minimum drag performance. These two items are considered as secondary flight control surfaces for specific flight regions and conditions.

FIG. 4 shows a table 400 describing the four control inceptors (lateral controller, longitudinal controller, collective level, and directional controller) associated with classical helicopter controls. Note that RPM of a helicopter is designed to be steady state held around 100% in normal flight condition. However, RPM knob control on the collective controller was also available to the pilot for a slow and small increment or decrement during the steady state flight. However, this control knob tuning function is not recommended for the pilot.

Figure 5:
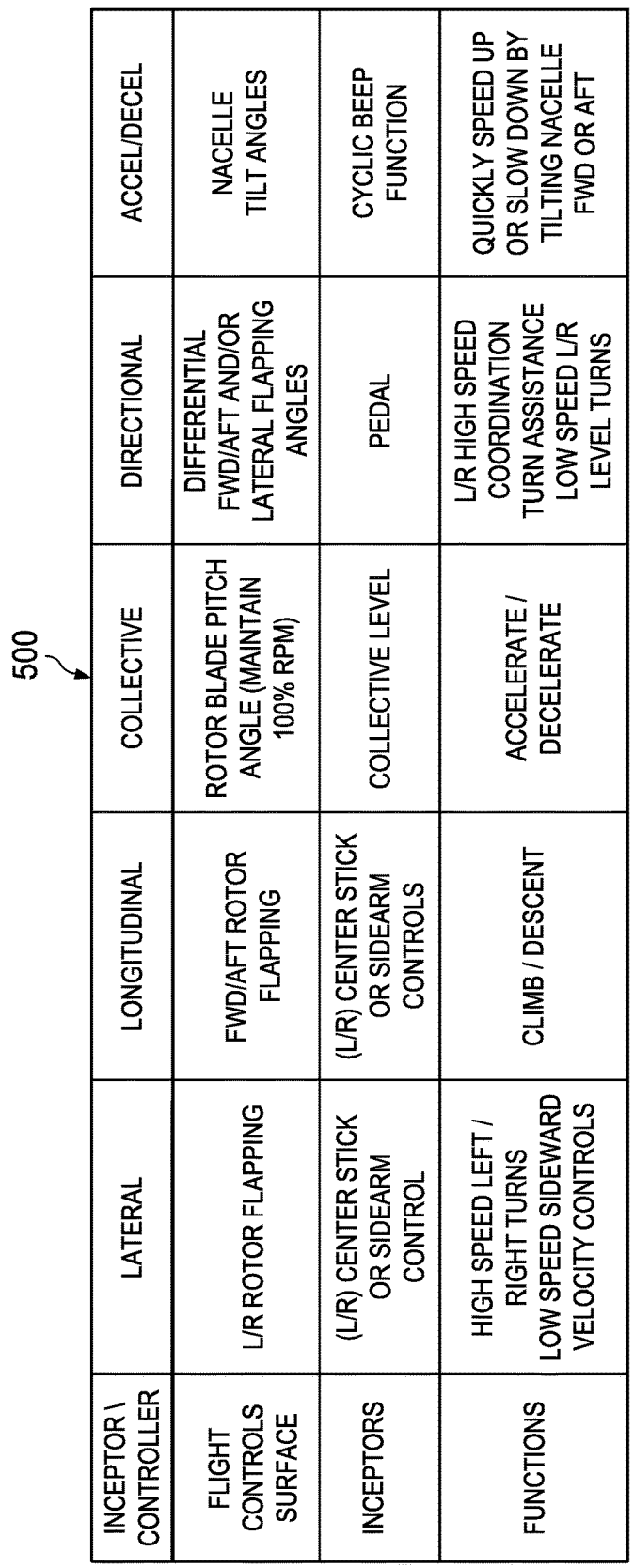

FIG. 5 shows a table 500 describing the five inceptors (lateral controller, longitudinal controller, collective or thrust level, directional controller and nacelle tilt (beep command) on the stick) associated with a tiltrotor in helicopter mode. Therefore, during the low speed region, the tiltrotor will fly like a helicopter, which uses the associated inceptors and actuators shown in Table 3.

FIG. 6 shows a table 600 describing the four inceptors (lateral controller, longitudinal controller, thrust level, and directional controller) associated with a tiltrotor in airplane mode. Note that the nacelle tilt angle in airplane mode is on the down-lock position and RMP is reduced to approximate 80% to 83% of its helicopter RPM defined as 100% RPM. The reason to low the RPM in airplane mode is to reduce the drag during airplane flight and improve the airplane performance and range.

For the various nacelle angle flights, the tiltrotor controls are with combination of helicopter controls and airplane control surfaces. A tiltrotor also contains nacelles tilted up and down functions, which can be controlled by the longitudinal stick with auto nacelle tilt followed by tiltrotor corridor design. The tiltrotor nacelle tilted up and down functions can also be controlled by the pilot by using nacelle beep function on the L/R cycle.

FIG. 7 shows a table 700 describing the inceptors associated with a conventional compound helicopter, such as the Sikorsky X-2 (using tail-rotor as a pushing propeller) or the Airbus X-3 (using two side rotors as propellers). The thrust control on Accel/Decel column can be designed automatically switched with respect to longitudinal controller or manual thrust adjustment using cycle beep. Note that all compound aircraft control inceptors and functions are considered in the current patent application.

Control manager 220 is suitable for uses on all the above aircrafts. Overall, all controller inceptors and functions discussed on the above can be design as a pre-specified baseline control in the current apparatus using a selectable software installation method. When the aircraft model is determined in the initial software installation, the control inceptor functions and management can be automatically integrated. The software algorithm and selection is demonstrated in the method 800 of FIG. 8. Method 800 can be extended to any other aircraft with its flight control inceptors and actuators. Therefore, it is not limited to airplane, helicopter, tiltrotor, and compound aircraft. The above software algorithm can also be extended any other aircraft configuration such as flying car, fighter, and so on.

Figure 9:
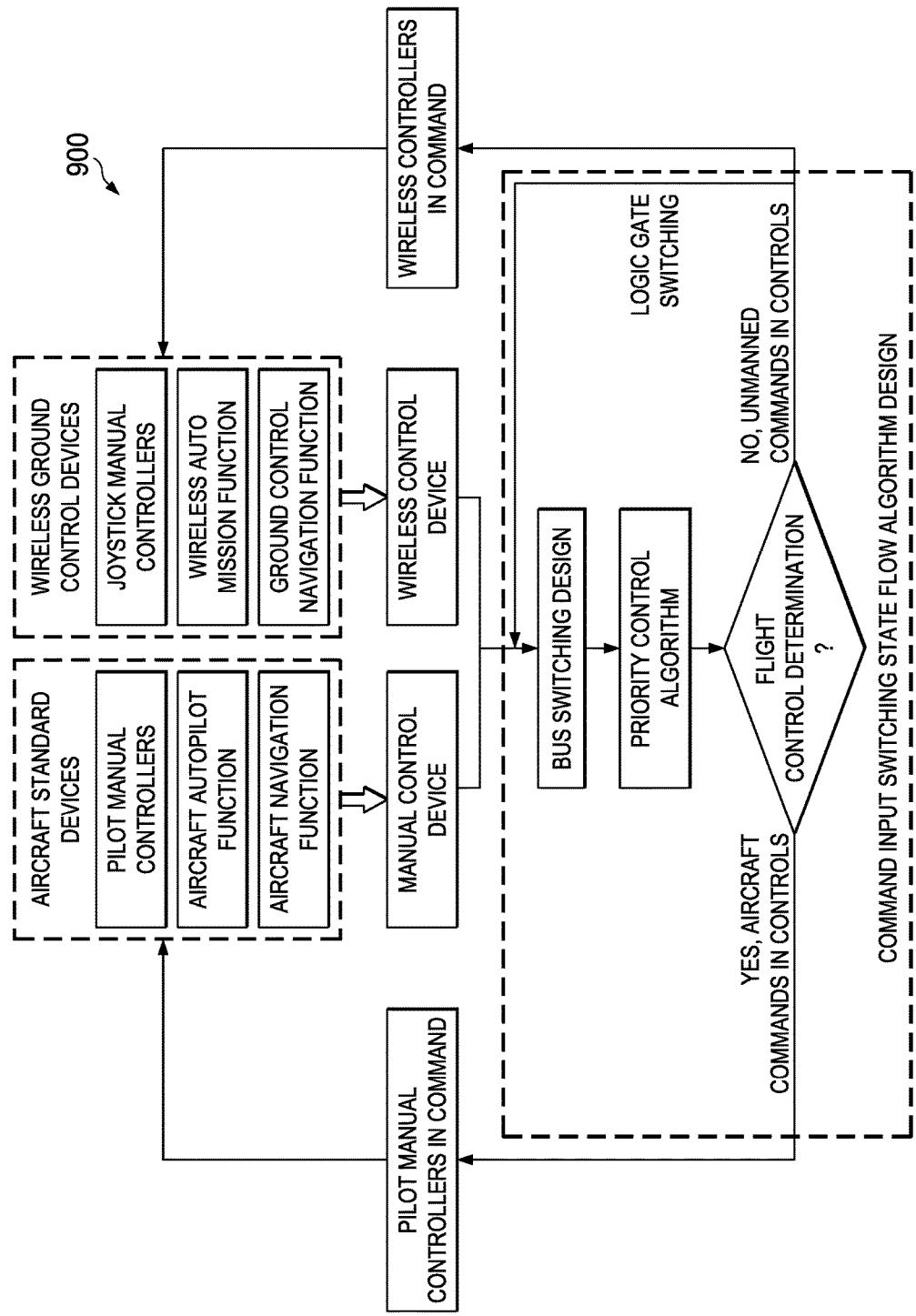
FIG. 9 shows a control inceptor management system for application in a tiltrotor such as the tiltrotor of FIG. 1.

FIG. 9 shows a control inceptor management system 900 for application in a tiltrotor such as the tiltrotor of FIG. 1. In FIG. 9, control inceptor management system 900 contains two groups of flight control command resources. The first set of control command signal is generated by the aircraft original design defined as manned controls. The second flight control command is generated from wireless signal which can be contributed from the various ground stations. To achieve manned optionally manned and unmanned operation, the signals may simultaneously receive the following two sources of controls: aircraft inceptors and controls; and wireless signals through uplink/downlink of the device. Note that the wireless control signals may have more than finite control/command sources.

In the manned flight, the V280 aircraft inceptors and controls may contain, as shown in the top left-hand side of FIG. 9:
 a) Four inceptor control force feel designs,
 b) Four manual controllers (longitudinal stick, latitude stick, collective lever, pedal),
  c) Nacelle beep fore/aft knob,
  d) autopilot controls, and
  e) flight director and navigation (mission, waypoint, etc) commands.

The control commands generated from the aircraft commands may be considered as manned flight; therefore, it is called manual control device commands. Items (a, b, c) may be considered as pilot manual controllers shown in the top left FIG. 9.

On the wireless command and control through uplink and downlink from one of the ground control station, the wireless command and control functions can be classified as Joystick signals,
 Autopilot mission commands and
 Navigation commands Note that the wireless signals to control the aircraft as shown in top right hand side of FIG. 9 can with any released UAV frequencies such as military satellite frequency bandwidth, and/or commercial open source frequency bandwidth. The commands generated from either fixed ground control stations or portable device or movable control stations are resourced from the wireless; therefore it is call wireless control device commands.

Note that many ground control station signals can be used to control the aircraft. However, inside the aircraft, the command signals from triple redundancy manual control devices may be used for control of the aircraft if the FBW VMS is targeted.

Figure 10:
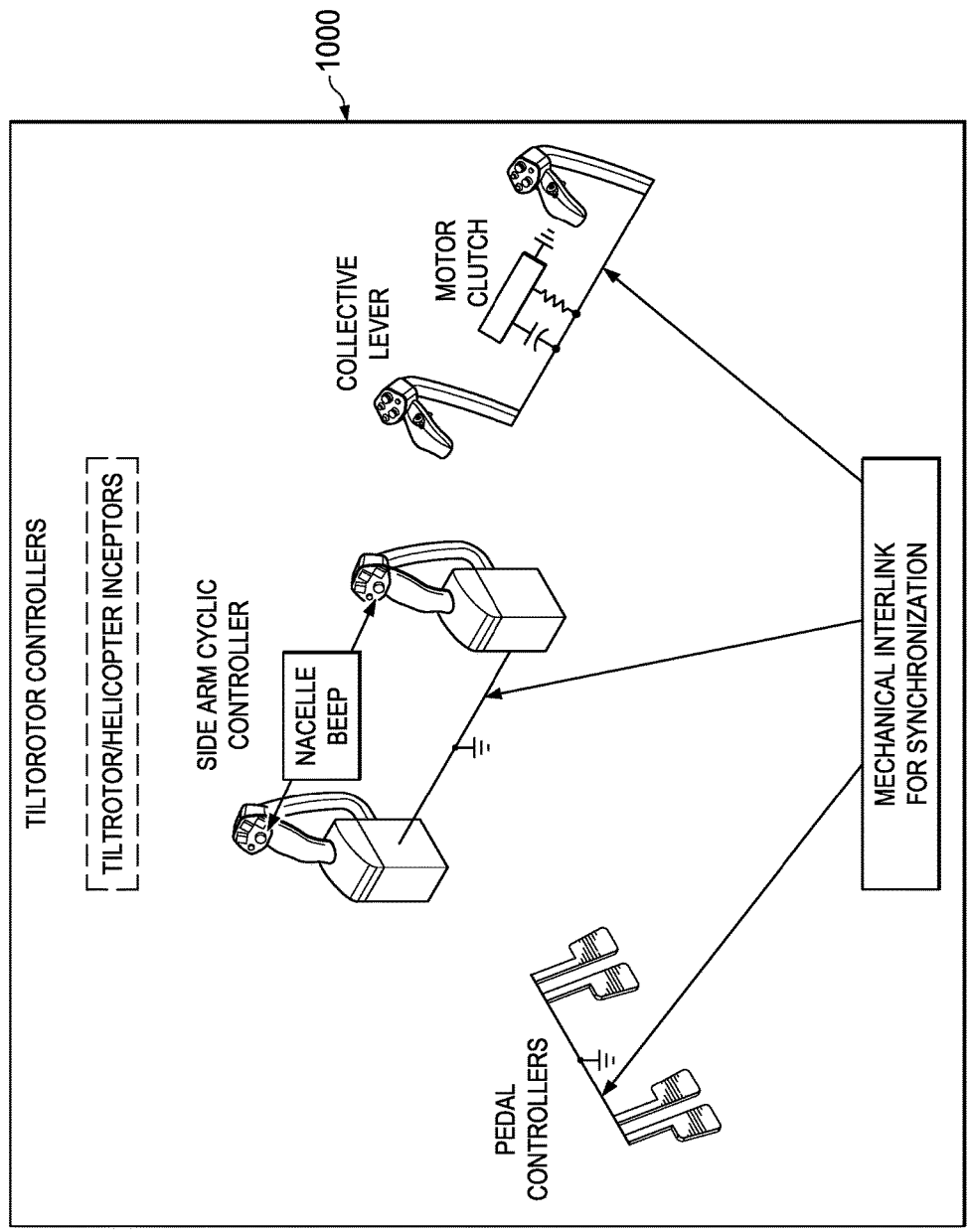
FIG. 10 shows tiltrotor controllers according to one example embodiment.

To fully implement various tiltrotor controllers 1000 as illustration shown in FIG. 10, a data bus 1100 as shown in FIG. 11 may be provided for associated aircraft inceptors and functions. From No 1 to 17 of Table 6, it is the complete list of the tiltrotor control inceptors.

Figure 12:
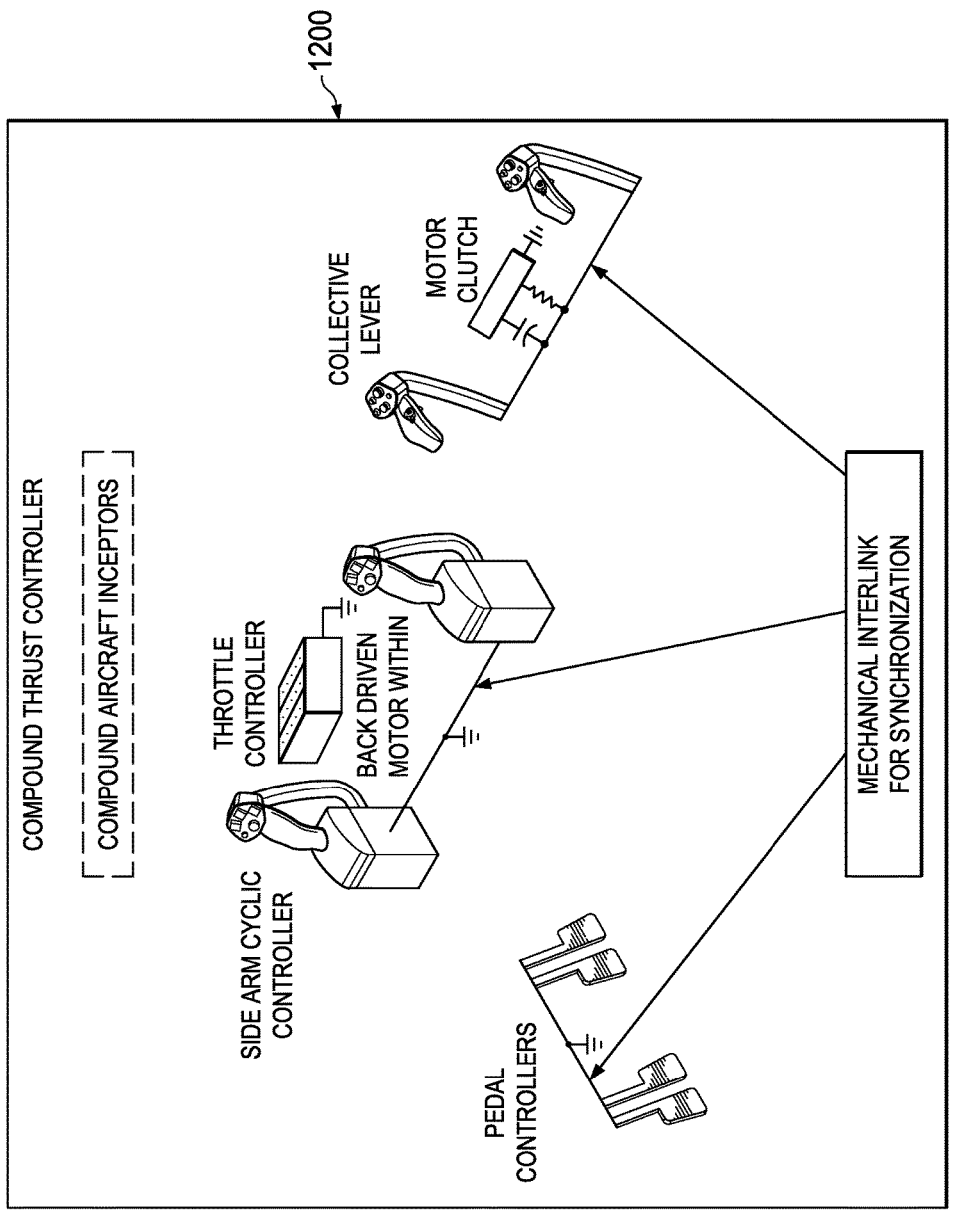
FIG. 12 shows a compound thrust controller according to one example embodiment.

For compound aircraft, instead of using nacelle tilt function defined as No 1 in data bus 1100, the compound thrust controller 1200 as shown in FIG. 12 will be used to form the similar set of full compound aircraft controls. For tiltrotor, the nacelle tilt function can be set to be autonomy conversion with longitudinal control. Similarly, for compound aircraft, the compound thrust controller can be designed to be autonomy conversion using longitudinal controller.

Note that inceptors of a commercial airplane can be considered as a subset of the tiltrotor. For example, if items (1, 2, 15 and 18) of data bus 1100 are not removed, inceptors of a commercial aircraft can then be formed. Similarly, inceptors of a helicopter can be considered as a subset of the tiltrotor. Inceptors of a helicopter can be formed by removing items (1, 2, 6 and 18) controls.

The above controls may be automatically switched, when aircraft type (jet, propeller, tiltrotor, compound aircraft, and control type (unique trim, back-drive trim) are determined.

Based on the above discussion, M/OM/UM flight by the autopilot mode, mission and navigation mode, the aircraft control interceptors will act like their original hold functions. However, the aircraft control inceptors inside the cockpit can be designed with several methods for FBW system. These inceptor control methods are
 1) Back-driven control
 2) Unique trim control
 3) Combinations of back-driven controller and unique trim controller Note that there are more than four control inceptors in cockpit, (longitudinal, lateral, throttle (collective), and pedal controllers) as shown in FIG. 5 for tiltrotor and FIG. 6 for a compound aircraft. These controllers can be designed all back-driven motor-clutch force feel design, or unique trim force feel design or combination of beck-driven and unique trim design. For example, BA609 inceptor control is design with method #3, which (longitudinal, lateral, collective) are with back-driven design, but the pedal control is designed by using the unique trim technology.

If the aircraft is designed using back-driven controllers of collective lever as shown in FIG. 5 with motor and clutch, in autopilot mode, mission mode, and navigation mode, the aircraft inceptors will follow their trim conditions using rate command back-driven method to keep up with the trim positions. If the trim position is off too much due to gust inputs or pilot inputs (says 0.5 inch difference from their trim positions) the FBW actuators will hold on to their maximum rate limit back-driven function and allow the other FBW control paths to overcome the trim difference situations. Therefore, once the trim-difference gets catch-up, the rate trim back-driven function then returns to normal.

For an inceptor unique trim system, in auto-pilot mode, mission mode, and navigation mode, the unique trim commands from individual control axis work as delta stick functions. During gust input condition, the stick will maintain on the center. Gust/turbulence rejection and/or cancelation will fully depend on the FBW control paths. For pilot command inputs in auto-pilot, mission, and navigation modes, the individual control laws loop design may be designed differently depending on the design requirements, such as coupled or uncoupled mode. For example, in auto-pilot mode, the pilot commands can be designed as coupled or uncoupled function with hold situation. Therefore, the delta stick on individual axis and airspeed regions will act differently. The pilot commands will just follow the mode switch logic to accomplish the pilot command input motions. Similarly, the commands from ground control station joysticks and aircraft inceptors will work like the delta stick functions following the control laws logic state to fly the aircraft.

No matter the aircraft inceptor design is pure back-driven controllers or unique controllers or any combination of back-driven and unique trim controllers, the apparatus have provided the solutions on the M/UM states for inceptor back-driven and unique trim.

During optionally manned condition, the autonomy controls is reserved on the wireless signal side. Wireless signal station contains three flight regions for this OM condition, autopilot, mission and navigation mode. The ground joystick is supposed to be disabled during the normal operation of OM mode. However, the aircraft manual stick functions can be active so that the pilot can help collision avoidance function. In the autopilot mode, the aircraft back-driven sticks will act like the piloted back-driven sticks with autopilot on. If the aircraft command will act either uncoupled or decoupled per the same way as manned type autopilot mode flight. Force trim function cannot be disable for aircraft auto-pilot coupled functions.

In OM mission flight mode, the aircraft sticks will work as the decoupled function similar to unmanned mode for both back-driven and unique trim controllers.

To successfully form M/OM/UM operation, the wireless signal side must be discussed more. On the wireless command side, the ground control station can contain joystick controllers, mission commands and navigation commands and other commands. As shown in FIG. 1, the ground control commands can be generated using the satellite wireless signals through a fixed ground command control station and/or moveable ground commands where the signals can be emitted from a car or warship or portable devices carried by a ground personal. Command management from multiple ground control stations and aircraft inceptor controls to form M/OM/UM flight must be carefully arranged so that the aircraft will maneuver per design. The detail of M/OM/UM signal management is discussed below.

To achieve manned, optionally manned and unmanned (M/OM/UM) flight control, command input management must be correctly and effectively implemented such that the correct set of signals can be used to control the aircraft. The decision of which signal set is in-control shall be correctly monitored and determined. Since aircraft commands do always exist inside the device; therefore, the aircraft command signals and cockpit switch positions can be set as the default commands. If no wireless device is installed in the aircraft, the device will be automatically switched to manned type aircraft flight. Therefore, it is not necessary to make any logic software switching or software code changing for this device for purely manned flight.

The wireless command signals are treated as optional signals. Manned and unmanned decision controlled by either ground control station, or aircraft pilot inceptors can be accomplished by two determination hard switches. The first switch device located inside the cockpit is called M/OM/UM switch which is to have the pilot manually switch the aircraft to perform the unmanned function. The second switch is controlled by the ground control station for emergency usage. Note that the emergency ground control switch can be designed either a hard switch or a software switch. This emergency ground control switch can be used during the following conditions to safely bring the aircraft home.

1) Aircraft is hijacked for terrorist control
2) Aircraft pilots lose conscious or lose capabilities of flying aircraft
3) Aircraft loses inceptor controls due to battle damages
4) Aircraft is with transponder SOS signal turning on Inside the aircraft, if the M/OM/UM switch is not switched to unmanned, the aircraft will only operate in manned type. Once the aircraft M/OM/UM switch is set to unmanned, the aircraft can be operated unmannedly.

The M/OM/UM switch inside the aircraft can be switched from manned to unmanned position by the pilot at any time during the unmanned flight. For example, the aircraft is initially operated manually. After a normal take-off, the pilot by switching the M/OM/UM switch to UM position can make the aircraft with unmanned operation. Similarly, if the aircraft is initially with unmanned operation, after a normal take-off, the pilot by switching the M/OM/UM switch to M position can make the aircraft operating manually.

The M/OM/UM aircraft can be used to see the aircraft take-off maneuver by either manned or unmanned command determined by setting the M/OM/UM switch position to be M or UM position. While other command control signals enters to the system, the priority algorithm in command input switching state flow algorithm shown in FIG. 4 will help to make the decision which control commands shall be used to control the aircraft.

For example, the aircraft is in the pilot manual control to take off and fly around, if the wireless signal is inserted, the pilot command will remain in controls, since the M/OM/UM switch position is still on M position. The wireless command will be ignored unless the ground control emergency control condition is engaged.

When the aircraft flight switches from manned to unmanned operation, the ground control command signal must be engaged to ensure safety of flight. Command signals from ground control stations can be transmitted and received by the aircraft TX/RX hardware using satellite wireless frequency or other military reserved wireless frequencies. With various types of ground control stations, the communication TX/RX frequencies between the aircraft and various ground control stations are assumed to be pre-arranged and installed. These control stations can be resources from the following type of ground control stations.

1) Fixed ground control station
2) Mobile ground control station, such as a ground station installed inside a car or boat, high altitude long endurance (HALE) aircraft, destroyer, carrier, etc
3) Portable ground control station (a suitcase type of ground control station)

Note that each type of ground control wireless command is not limited to one set of signals being received by the aircraft. Therefore, the finite ground control wireless commands can be formed to controlling the unmanned flight of the desired aircraft. Management of priority of manned and unmanned control commands in the aircraft and/or from various ground control stations has become challenging and important.

Figure 13:
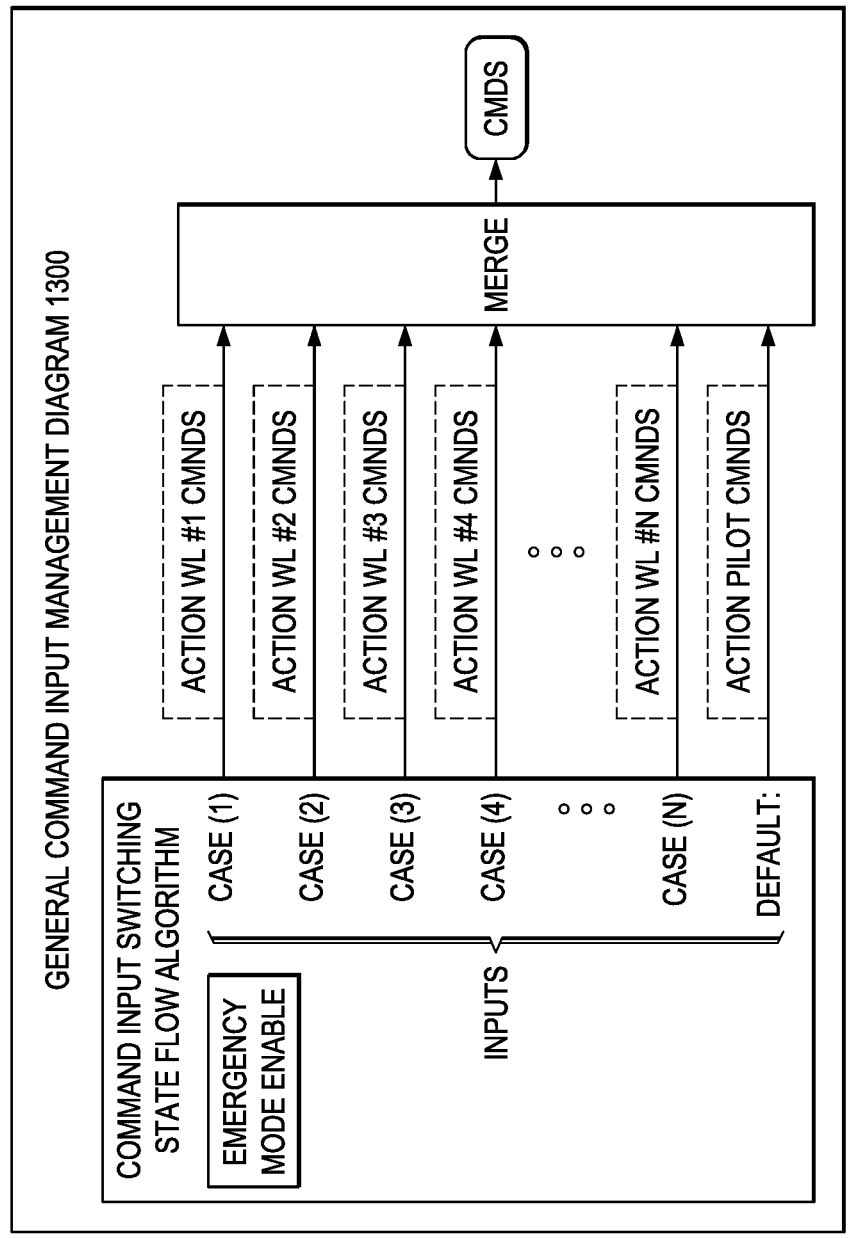
FIG. 13 shows a general command input management diagram according to one example embodiment.

A general command input management diagram 1300, combining the aircraft commands with the commands from finite wireless ground control stations, is shown in FIG. 13. It is noted that only one set of command input set will be used to control the aircraft. When the initial set of input signal is used, it will be automatically switched as the default set. The initial default input command set is determined by the aircraft M/OM/UM switch position.

As shown in FIG. 13, the commands can come from two sides. One is the aircraft controllers defined as default and the other is the wireless control commands shown in FIG. 13 with finite cases, N. On the aircraft command side, there are three sources. The first one is the pilot controllers for manual control, and the second one is the autopilot commands and the third is the aircraft guidance and navigation commands.

In FIG. 13, it is assumed that the total wireless commands can be finite sets as N. The action is to form an enable switching function to allow the individual command to be ON (pass through) or OFF (stop). Note that only one priority command set will be passed through and controlled by the state flow logic switching algorithm design, which will be discussed later. In the top left block of FIG. 13, ground control stations also contain the emergency mode enable function, which can be turned on during aircraft being hijacked to avoid aircraft being used as a weapon of mass destruction. Depending on command input switch state flow logic algorithm, the algorithm will not make any decisions but staying at the current default case. If and only if the digital state inputs make changes, the algorithm will help making the decision if the aircraft command source has been asked for changes. For example, if the original take of commands are resourced from the pilot and the M/OM/UM switch position is set to M, which is the bottom line of FIG. 13, the aircraft will remain on manned flight until 1) The pilot sets the M/OM/UM switch position to OM or UM.
2) On the ground control station, the emergency mode is activated to the current aircraft.

The merge block on the right hand side of FIG. 13 is to merge various command signals into a single output command. If the initial condition of this output signal command is not specified by the "initial condition," then the initial condition will be considered as empty, which means the aircraft is to maintain the current flight condition. If the initial condition is not empty, the aircraft will merge to the new commands and fly through the new condition.

In the aircraft cockpit, the M/OM/UM switch is one of digital the inputs which can make the aircraft switched from either manned or optionally manned or unmanned status. If the switch is in manned position, the aircraft is with manned type of control, which is similar to the classic aircraft control. All ground control station command signals will be disabled.

If the M/OM/UM switch is set to OM, which means the aircraft is in bi-usage stage. In the OM status, the aircraft can be handled coupled and decoupled with the pilot input, similar to flight director mode. If the wireless long navigation or waypoint mode is on, the pilot command will work as coupled mode, which means the pilot command will be considered as collision avoidance situation command. After the pilot sticks return to in-detent positions, the aircraft will couple back to its original target destination. If ground control command is on autopilot mode, which means no destination and just hold altitude, heading and speed, the pilot command will work as decoupled mode. In this situation, if pilot commands change the aircraft to a new airspeed, altitude, and/or new heading, the aircraft will hold on the new speed, heading angle and altitude when the sticks returns to in-detent. During optional manned situation, the ground control station signal will only have FD and AP command pass through. The joystick of the ground control station will be replaced by the aircraft stick controls.

If the M/OM/UM switch is set to UM, the pilot controls inside the aircraft will be totally disabled. In this situation, the wireless commands are in full controls of the aircraft.

During the UM operation, the autopilot mode is set as default mode if no other command input (such as joystick commands or mission commands or navigation commands) is in-controls. In this situation, the aircraft will remain at its current flight hold situations such as speed hold, altitude hold and heading hold or steady state level turn. This mode is also treated as losing wireless signals when the aircraft entering the GPS/wireless denying conditions/environments. These conditions can occur during GPS/wireless signals being blocked by clouds, or weather storms, or brown-out or entering the enemy anti-wireless transiting signal regions.

To form a perfect M/OM/UM flight control system to monitor the aircraft operation, the aircraft in the cockpit is assumed with a M/OM/UM switch for functional selection. Besides that, several assistant devices to help convert aircraft flight control from manned to unmanned operation are also assumed being installed. The entire equipment sets in the aircraft are 1) Aircraft M/OM/UM switch
2) Aircraft eye-contact device (if installed)
3) Aircraft pulse input response device (if installed)
4) Cockpit cam image (if installed)
5) Motion sensors to detect healthy condition of pilots or others device (if installed)

Figure 8:
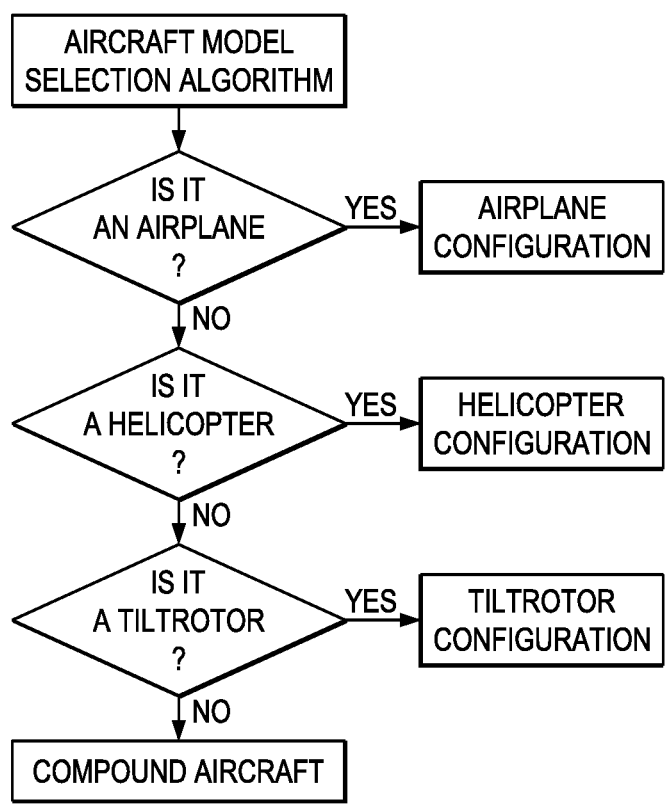
FIG. 8 shows a method according to one example embodiment.

Based on the above devices, the control flow chart of command input switching state flow algorithm design is shown in FIG. 8. Any device is not installed in the aircraft on the above list will be set as default value of zero, which will not affect logic algorithm accuracy.

Therefore, listed items of (2, 3, 4, 5) on the above are placed in the top left corner of FIG. 8. These items are optional devices to help the ground control station determine whether the emergency control shall be pressed or not during emergency condition.

Other assistant devices on the top left of FIG. 8 can be illustrated as the motion sensor on item 5 or the avionics transponder setting being changes to SOS mode. If the specified device from items (2, 3, 4, 5) is not installed (or considered as absent), its associated logical input will be set to its default value (zero) so that this input signal will not be used to help make the M/OM/UM logical switching decision. With the default logical design to help software decision determination, the software code is in on need to subject to code changes during software installation. The entire flow chart will automatically be controlled by the aircraft M/OM/UM switch position. Therefore, the aircraft will be operated with one validated position. Note that all signals from items (1 thru 5) will be treated as digital. Any items, which are absent/not installed, will be treated as the default values=zero.

In the aircraft, beside the above M/OM/UM switching position, the mode status and command positions are also acted as logical input states to the state flow diagram so that in manned flight, these two sets of signals will be used to operate the aircraft just exactly like the piloted aircraft.

Figure 14:
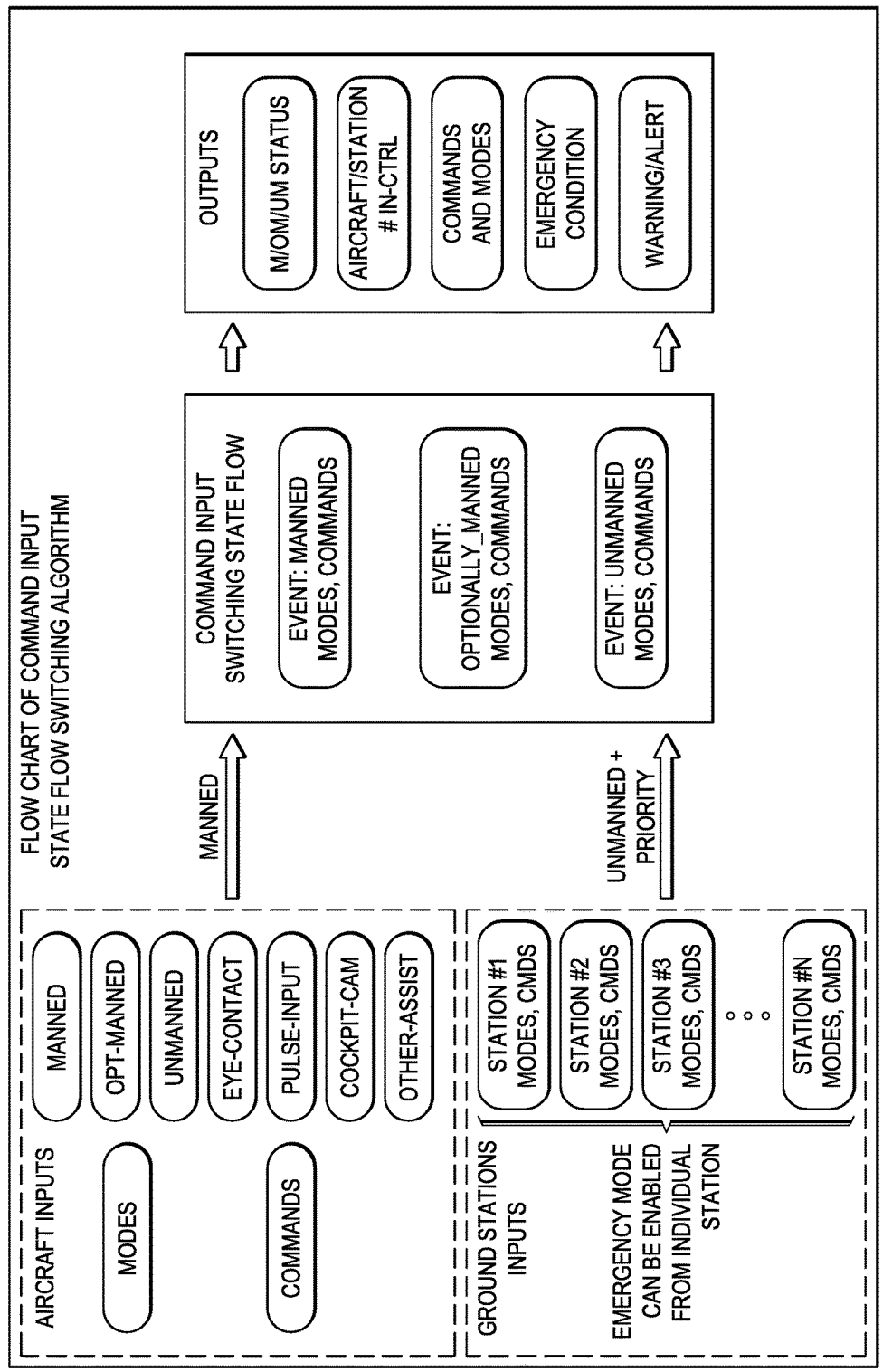
FIG. 14 shows a flow chart of command input state flow switching algorithm according to one example embodiment.

On the ground control stations inputs shown in the bottom left of FIG. 14, finite ground station signals inputs, their mode status and commands are used to accomplish the entire algorithm design into the state flow shown in FIG. 13. These modes and commands are treated as standby modes and commands. Depending on the state flow switching algorithm, if the logic algorithm has made the aircraft control switched to OM or UM, the #1 priority of the ground control station in the finite ground control station commands will take control of the aircraft. This ground control station mode status and commands will be used to operate the aircraft unmannedly.

The priority rank of ground control stations is based on standard ground control station rule. The priority rules are based on:

1) The distances between aircraft and ground control stations
2) Signal health conditions
3) Ground control station ranks (fixed, mobile, portable and so on)
4) Communication of all round control stations to pre-select the priority Several military ground control station configuration rules may also apply for this apparatus. For example, if a HALE UAV works as ground control station military rank of generals, based on military priority rule, this rank will take control of ground control station ranks of colonels, and commanders, platoon leaders and soldiers for mobile ground control stations.

In FIG. 14, the right hand side of the diagram is the state flow output, which contains M/OM/UM state to control the aircraft. It will also display if the aircraft is controlled by the aircraft itself (Manned) or a specified ground control station. The aircraft modes status and command used to control the aircraft will also be displayed. As mentioned on the above, finite ground control station commands and mode status are entered as the standby aspects. On the center of FIG. 14, the switching state flow algorithm will make up the M/OM/UM control decision based on the input information from inputs data. During the normal flight, if the original set up is for manned type of the flight, the aircraft default operation method will be piloted-control, as long as no other input logic signals being changed. Similarly, if the original flight method is unmanned, the aircraft will remain unmanned flight until the pilot inside the aircraft decides to take the control. Note that, if the aircraft initially operates unmannedly without any pilot on-board, the aircraft will only take the unmanned commands from individual ground control station. It is impossible to switch back to manned type of flight.

FIG. 14 contains four portions, which are
a) Aircraft inputs
b) Finite ground control station inputs
c) Command Input state slow switching algorithm
d) Output command to control the aircraft In FIG. 14, item (a) and (b) has been discussed on the above section. Details of command input state flow switching algorithm is discussed and shown in FIG. 9. In this figure, it is shown that the entire state flow contains three decision events Manned
Optionally manned
unmanned When default initial condition entering the system, only one of these events will be selected. The decision of initial default flight method will be based on the cockpit M/OM/UM switch position. If the original default M/OM/UM switch position is set to the UM position and no pilot on-board, the aircraft will operate like a pure unmanned aircraft. The command input switching state flow algorithm will only stay on the unmanned event. The algorithm will only allow the aircraft control system to switch the command inputs and flight modes from one ground control station to the other ground control station. The M/OM/UM aircraft flight operation situation can be displayed on the each ground control station, as long as the aircraft is within the ground control wireless sensor signal range. However, for controlling the aircraft, the command input state flow algorithm will take the priority bit of the available ground control stations. The decision of this priority bit is determined by the following criteria:

1) priority decision and determination from available ground control stations through their own communication system
2) Priority decision and determination based on system availability if no priority bit exists. For example, the fixed ground control station using direct satellite wireless signal will be in-control unless they allow the movable ground control station taking control such as car or warship and so on. The portable ground control station is the less priority to take the aircraft control.
3) The portable ground control station can be in control if and only if the fixed and/or movable ground control stations are authorized to do so.

Finite numbers of priority ground control station are designed in the state flow inputs. If only three ground control station are available to emit the command/mode signals, the priority bit will be up to three. The unused default ground control station inputs in state flow algorithm will be reset to zero so that the system will automatically recognize that the possibility of the command and mode inputs can come from only these three stations. When the M/OM/UM aircraft reaches the other wireless command input zone, the state flow algorithm will trigger one more available ground control station for command inputs. However, initial entrance of this ground control station will be treated as priority 4 unless the priority 1 ground control station give the authority to the new ground control station or all other three ground control stations lose are either out of range, become unavailable or lose their priority bit.

Figure 15:
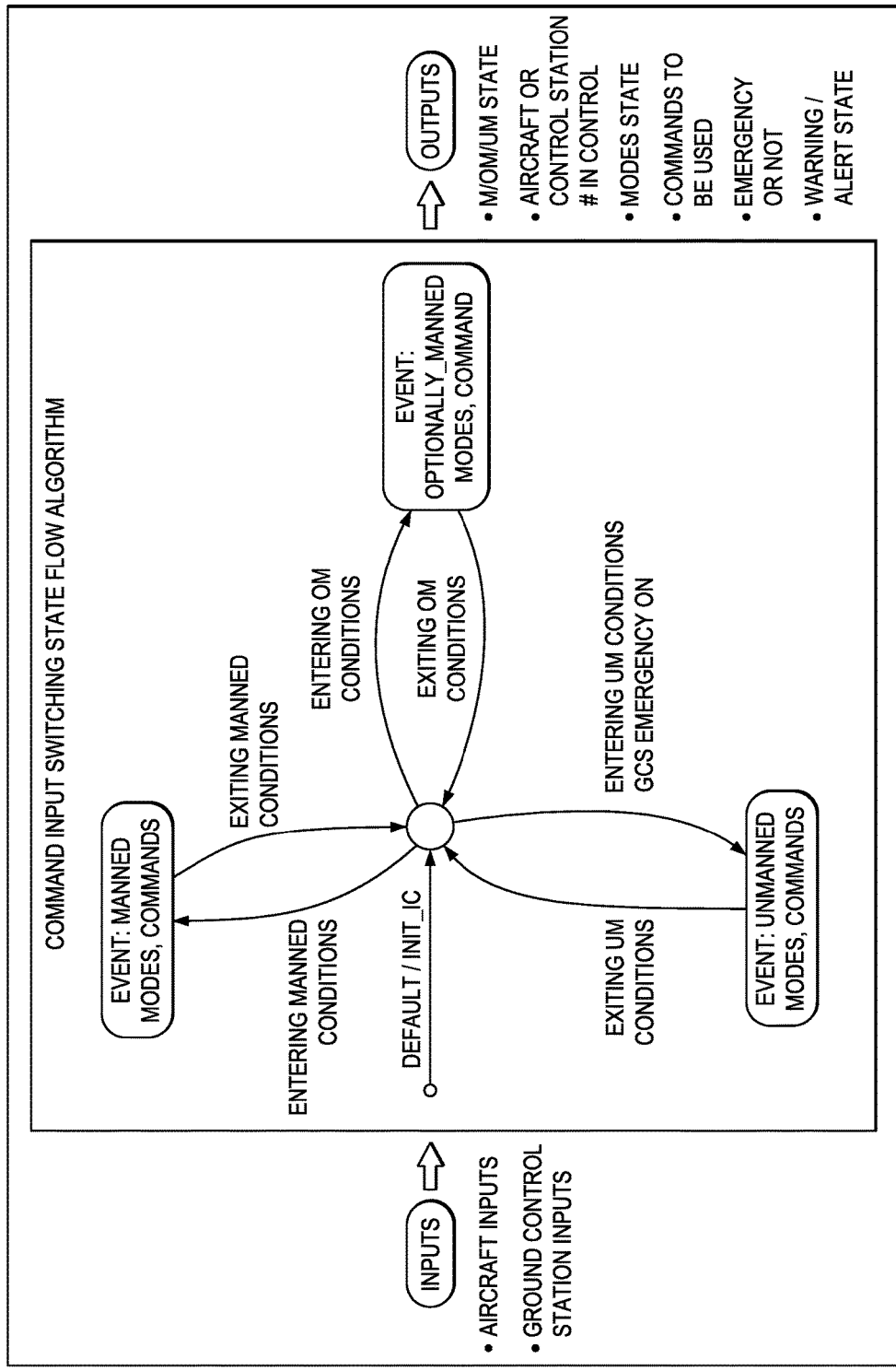
FIG. 15 shows a command input state flow switching algorithm design according to one example embodiment.

FIG. 15 shows a command input state flow switching algorithm design 1500 according to one example embodiment. Command input switching state flow algorithm is initially set to the default position of the M/OM/UM switch position inside the aircraft cockpit as the aircraft starts up. If command inputs are not changed during the entire maneuvers, the aircraft will be operated as its original switch set-up position. The state flow algorithm will keep the aircraft function as its default function unless one of the following situations takes place:

1) M/OM/UM switch position gets changes by the pilot
2) The pilot in the cockpit makes the aircraft control stick out-of-detent or press force-trim release button which intends to make aircraft changes its maneuver from its original flight path.
3) On the activated ground control station, the emergency control switch is pressed and ground pilots want to take control of the aircraft due to a situation awareness emergency condition.

The above situation will depend on the situation awareness based on the ground control station operation and/or the pilot command situation. The pilot video camera in the cockpit, the LIDAR information, information from flight data, flight path and aircraft heath monitor units all can be hooked to the device to help determine whether the aircraft shall remain in the pilot control or switch to the ground control station command.

A special emergency control function is reserved for the ground control station, which is called the hijack mode. If the aircraft was hijacked by terrorists, the hijack mode can be triggered by the pilot or copilot by switch M/OM/UM switching, or set S-transponder to SOS status, or cockpit assist devices. For example, if the pulse device is installed, the hijack mode can be triggered by removing the pulse device. If cockpit camera is installed, the on-line video can also be used by ground control station to help determine if the hijack condition is taken place in the aircraft or not.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it may be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A rotorcraft, comprising:
   a body;
   a power train coupled to the body and comprising an engine and a drive shaft coupled to the engine;
   a rotor system coupled to the power train, the rotor system comprising at least one rotor blade;
   a flight control inceptor configured to receive instructions from a pilot to change one or more aspects of the rotor system; and
   a control manager disposed between the rotor system and the flight control inceptor, the control manager configured to:
   determine a type of aircraft;
   receive control commands wirelessly from a ground control station;
   as a function of the type of aircraft determined, translate the control commands into one or more axes associated with the flight control inceptor; and
   transmit the translated control commands to the rotor system in place of the instructions received from the pilot via the flight control inceptor.

\* \* \* \* \*